United States Patent
Takano

(10) Patent No.: US 11,937,118 B2
(45) Date of Patent: Mar. 19, 2024

(54) NETWORK DEPLOYMENT CONTROL APPARATUS, COMMUNICATION SYSTEM, AND CONTROL METHOD THEREFOR

(71) Applicant: Sony Group Corporation, Tokyo (JP)

(72) Inventor: Hiroaki Takano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 356 days.

(21) Appl. No.: 17/299,789

(22) PCT Filed: Nov. 15, 2019

(86) PCT No.: PCT/JP2019/044827
§ 371 (c)(1),
(2) Date: Jun. 4, 2021

(87) PCT Pub. No.: WO2020/152954
PCT Pub. Date: Jul. 30, 2020

(65) Prior Publication Data
US 2022/0022091 A1    Jan. 20, 2022

(30) Foreign Application Priority Data

Jan. 23, 2019 (JP) .................. 2019-009455

(51) Int. Cl.
*H04W 28/02* (2009.01)
*H04W 24/02* (2009.01)
*H04W 28/18* (2009.01)

(52) U.S. Cl.
CPC ....... *H04W 28/0268* (2013.01); *H04W 24/02* (2013.01); *H04W 28/18* (2013.01)

(58) Field of Classification Search
CPC .. H04W 28/0268; H04W 28/18; H04W 24/02
See application file for complete search history.

(56) References Cited

U.S. PATENT DOCUMENTS

2018/0041897 A1\* 2/2018 Prasad .................. H04W 4/50
2018/0376338 A1   12/2018 Ashrafi
(Continued)

FOREIGN PATENT DOCUMENTS

EP      3 253 101 A1    12/2017
JP      2017-17656 A     1/2017
(Continued)

OTHER PUBLICATIONS

International Search Report and Written Opinion dated Dec. 24, 2019, received for PCT Application PCT/JP2019/044827, Filed on Nov. 15, 2019, 10 pages including English Translation.
(Continued)

*Primary Examiner* — Derrick V Rose
(74) *Attorney, Agent, or Firm* — XSENSUS LLP

(57) ABSTRACT

In edge computing that deploys a function regarding network user data near equipment, deployment of a network function is flexibly controlled.
An acquisition unit acquires information regarding performance corresponding to a deployment position of a predetermined partial function of a network. A fixing unit fixes the deployment position of the predetermined partial function of the network on the basis of the information regarding the performance. A setting request unit issues a request of setting the predetermined partial function of the network for the deployment position fixed by the fixing unit to a network.

6 Claims, 18 Drawing Sheets

(56) References Cited

U.S. PATENT DOCUMENTS

| | | | |
|---|---|---|---|
| 2020/0052991 A1* | 2/2020 | Kodaypak | H04W 24/08 |
| 2021/0105193 A1* | 4/2021 | Chong | H04L 41/5067 |
| 2021/0168658 A1* | 6/2021 | Yu | H04M 15/66 |
| 2022/0014434 A1* | 1/2022 | Shi | H04L 41/5019 |
| 2022/0022088 A1* | 1/2022 | Gebert | H04L 69/28 |

FOREIGN PATENT DOCUMENTS

| | | |
|---|---|---|
| JP | 2017-143365 A | 8/2017 |
| WO | 2017/002729 A1 | 1/2017 |
| WO | 2017/194619 A1 | 11/2017 |
| WO | 2018/086674 A1 | 5/2018 |
| WO | 2018/166379 A1 | 9/2018 |

OTHER PUBLICATIONS

Arai et al., "Proposal for a Method of Deploying Apps in Carrier Clouds", Proceedings of the 2016 IEICE General Conference, B-6-64, Mar. 1, 2016, pp. 64.

Extended European Search Report dated Feb. 11, 2022, in corresponding European Application 19911328.3, 10 pp.

Vodafone, "User plane function selection for URLLC" [online], 3GPP TSG SA WG2 #124, S2-178596, 26 pgs., Nov. 27-Dec. 1, 2017, Reno NV USA.

\* cited by examiner

FIG. 5

| UPF SETTING NUMBER | LATENCY TIME BETWEEN BASE STATION APPARATUS AND UPF |
|---|---|
| 1 | 1ms |
| 2 | 5ms |
| 3 | 10ms |

FIG. 7

| UPF SETTING NUMBER | LATENCY TIME BETWEEN AF AND UPF |
|---|---|
| 1 | 1ms |
| 2 | 5ms |
| 3 | 10ms |

FIG. 9

| UPF SETTING NUMBER | RESISTANCE TO CONGESTION |
|---|---|
| 1 | LOW |
| 2 | HIGH |
| 3 | MIDDLE |

FIG. 10

| UPF SETTING NUMBER | CHARGING COST WHICH SERVICE PROVIDER PAYS |
|---|---|
| 1 | LOW |
| 2 | HIGH |
| 3 | MIDDLE |

FIG. 11

| UPF SETTING NUMBER | THROUGHPUT |
|---|---|
| 1 | LOW |
| 2 | HIGH |
| 3 | MIDDLE |

FIG. 16

| SETTING ITEM | CONTENTS OF DEPLOYMENT REQUEST |
|---|---|
| PART A OF COMMON CONTROL FUNCTION DEPLOYED? | YES/NO |
| DESIGNATE NETWORK SLICE | NETWORK SLICE IDENTIFIER |
| PART B OF CONTROL PLANE DEPLOYED IN DESIGNATED NETWORK SLICE? | YES/NO |
| PART C OF USER PLANE DEPLOYED IN DESIGNATED NETWORK SLICE? | YES/NO |

FIG. 17

| SETTING ITEM | CONTENTS OF DEPLOYMENT REQUEST |
|---|---|
| PART A OF COMMON CONTROL FUNCTION DEPLOYED? | YES/NO |
| NUMBER OF NETWORK SLICES | "2" |
| DESIGNATE NETWORK SLICE | NETWORK SLICE IDENTIFIER=#1 |
| PART B OF CONTROL PLANE DEPLOYED IN NETWORK SLICE #1? | YES/NO |
| PART C OF USER PLANE DEPLOYED IN NETWORK SLICE #1? | YES/NO |
| DESIGNATE NETWORK SLICE | NETWORK SLICE IDENTIFIER=#2 |
| PART B OF CONTROL PLANE DEPLOYED IN NETWORK SLICE #2? | YES/NO |
| PART C OF USER PLANE DEPLOYED IN NETWORK SLICE #2? | YES/NO |

FIG. 18

| SETTING ITEM | RESISTANCE TO CONGESTION |
|---|---|
| PART A OF COMMON CONTROL FUNCTION | HIGH/MIDDLE/LOW |
| DESIGNATE NETWORK SLICE | NETWORK SLICE IDENTIFIER |
| PART B OF CONTROL PLANE IN DESIGNATED NETWORK SLICE | HIGH/MIDDLE/LOW |
| PART C OF USER PLANE IN DESIGNATED NETWORK SLICE | HIGH/MIDDLE/LOW |

NETWORK DEPLOYMENT CONTROL APPARATUS, COMMUNICATION SYSTEM, AND CONTROL METHOD THEREFOR

CROSS-REFERENCE TO RELATED APPLICATIONS

The present application is based on PCT filing PCT/JP2019/044827, filed Nov. 15, 2019, which claims priority to JP 2019-009455, filed Jan. 23, 2019, the entire contents of each are incorporated herein by reference.

TECHNICAL FIELD

The present technology relates to a communication system. Specifically, the present technology relates to a network deployment control apparatus for controlling network deployment, a communication system, and a control method therefor.

BACKGROUND ART

In a communication system, an edge computing technology has been known, which deploys a function regarding network user data near equipment. This enables reduction in communication latency, and also enables decentralization of load in a system. For example, it has been proposed to use an edge server for managing a wireless resource of a base station in accordance with characteristics of equipment (refer to, for example, Patent Document 1).

CITATION LIST

Patent Document

Patent Document 1: Japanese Patent Application Laid-Open No. 2017-017656

SUMMARY OF THE INVENTION

Problems to be Solved by the Invention

In the conventional art described above, deployment of a desired function near equipment enables low latency of a network and management of a wireless resource between the equipment and a base station. However, there is a problem that it is impossible for a service provider to flexibly control deployment of a network function in edge computing, and it is difficult to achieve satisfactory performance.

The present technology has been conceived in view of such a circumstance, and an object of the present technology is to flexibly control deployment of a network function in edge computing.

Solutions to Problems

The present technology has been made to solve the problems described above, and a first aspect thereof is directed to a network deployment control apparatus including: an acquisition unit configured to acquire information regarding performance corresponding to a deployment position of a predetermined partial function of a network; a fixing unit configured to fix the deployment position of the partial function on the basis of the information regarding the performance; and a setting request unit configured to issue a request of setting the partial function for the fixed deployment position, to the network, a communication system, and a network deployment control method. This brings about a functional effect of deploying the predetermined partial function of the network at the deployment position fixed on the basis of the information regarding the performance.

Furthermore, in this first aspect, the information regarding the performance may contain at least one of a latency, a cost, a resistance to congestion, or an assumed throughput. This brings about a functional effect of deploying the predetermined partial function of the network in consideration of the latency, the cost, the resistance to congestion, and the assumed throughput.

Furthermore, in this first aspect, the acquisition unit may acquire the information regarding the performance by issuing a request of measuring the performance and issuing a request of giving the measured performance. This brings about a functional effect of deploying the predetermined partial function of the network on the basis of the information regarding the measured performance.

Furthermore, in this first aspect, the fixing unit may fix the deployment position of the partial function from among a plurality of alternatives given in advance. This brings about a functional effect of fixing the deployment position of the partial function in accordance with a condition selected from the plurality of alternatives.

Furthermore, in this first aspect, the partial function may include a user plane function of performing user data exchange processing. In this case, the information regarding the performance may include a latency time from the user plane function or a latency time between the user plane function and a base station.

Furthermore, in this first aspect, the partial function may include a predetermined plane in a predetermined network slice. In this case, the predetermined plane may include a control plane for control processing, or may include a user plane for user data exchange processing.

Furthermore, in this first aspect, the network may include a core network in a 3GPP standard.

BRIEF DESCRIPTION OF DRAWINGS

FIG. 5 is a diagram that illustrates a first example of information given to the AF 104 according to the first embodiment of the present technology.

FIG. 7 is a diagram that illustrates a second example of the information given to the AF 104 according to the first embodiment of the present technology.

FIG. 9 is a diagram that illustrates a third example of the information given to the AF 104 according to the first embodiment of the present technology.

FIG. 10 is a diagram that illustrates a fourth example of the information given to the AF 104 according to the first embodiment of the present technology.

FIG. 11 is a diagram that illustrates a fifth example of the information given to the AF 104 according to the first embodiment of the present technology.

FIG. 16 is a diagram that illustrates a first example of a deployment request from an AF 104 according to the second embodiment of the present technology.

FIG. 17 is a diagram that illustrates a second example of the deployment request from the AF 104 according to the second embodiment of the present technology.

FIG. 18 is a diagram that illustrates a third example of the deployment request from the AF 104 according to the second embodiment of the present technology.

MODE FOR CARRYING OUT THE INVENTION

Hereinafter, a description will be given of a mode for carrying out the present technology (hereinafter, referred to as an embodiment). The description is given in the following order.

1. First embodiment (example of deploying user plane function)
2. Second embodiment (example of deploying part of network slice)

1. First Embodiment

[Configuration of Communication System]

Figure 1:
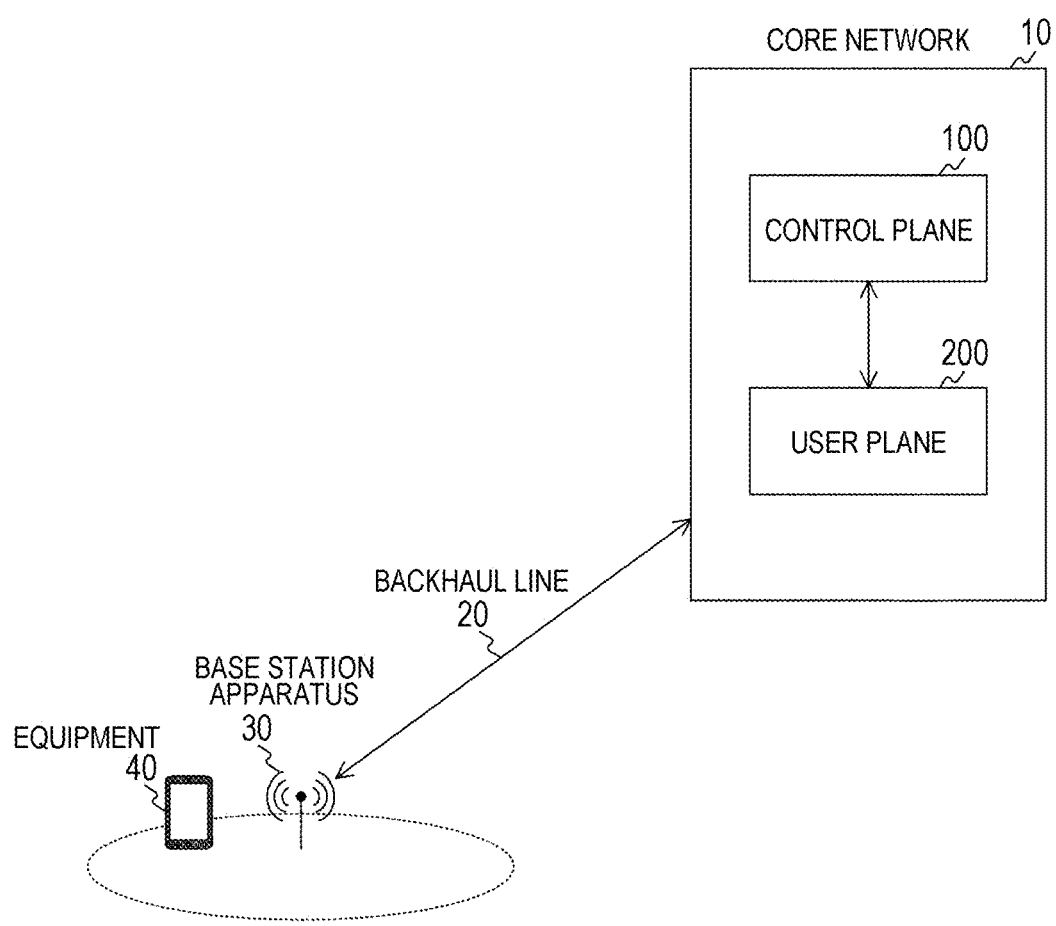
FIG. 1 is a diagram that illustrates an overall configuration example of a communication system according to an embodiment of the present technology.

FIG. 1 is a diagram that illustrates an overall configuration example of a communication system according to an embodiment of the present technology. This communication system includes a core network 10 conforming to the third generation partnership project (3GPP) standard, and a base station apparatus 30.

The core network 10 is a backbone that constitutes a public network, and examples thereof may include an evolved packet core (EPC) and a 5G next generation core. This core network 10 is dividable into a control plane 100 and a user plane 200. The control plane 100 is a functional group for control processing such as line connection. The user plane 200 is a functional group for user data exchange processing.

The base station apparatus 30 is a base station that constitutes a radio access network (RAN) and provides a network connection to equipment 40. This base station apparatus 30 is connected to the core network 10 via a backhaul line 20.

The backhaul line 20 is a line that relays an access line of the base station apparatus 30 and a backbone line of the core network 10 in a wireless or wired manner.

The equipment 40 is user equipment (UE) which a user uses.

In the 3GPP, new radio access (NR) for a fifth generation cellular communication system (5G) has been taken into consideration as a successor to a RAN called long term evolution (LTE). The NR has two features. One of the features is to achieve high-speed and large-capacity communication, using a frequency band from 6 GHz or more to 100 GHz. The other feature is to efficiently accommodate communication forms of various use cases. Here, various use cases involve high-speed and large-capacity communication, low-latency communication, and machine type communication (MTC). Moreover, it is required to simultaneously accommodate device to device (D2D). It is required to accommodate these various communications in one network.

There has conventionally been an EPC as a technology on the core network side connected to a RAN. A new core has currently been taken into consideration as a successor to the EPC. It is required for the new core to efficiently accommodate various communication forms, such as mobile broad band, low latency communication, MTC, and D2D, which the NR provides and to reduce capital expense and operating expense (CAPEX/OPEX). It is difficult to provide the various communication forms while keeping the CAPEX/OPEX low, if separate communication networks are prepared. It is therefore necessary to achieve the operation using a single network and to flexibly change the capacity of the network in response to the importance of the communication amount of each communication form.

Figure 2:
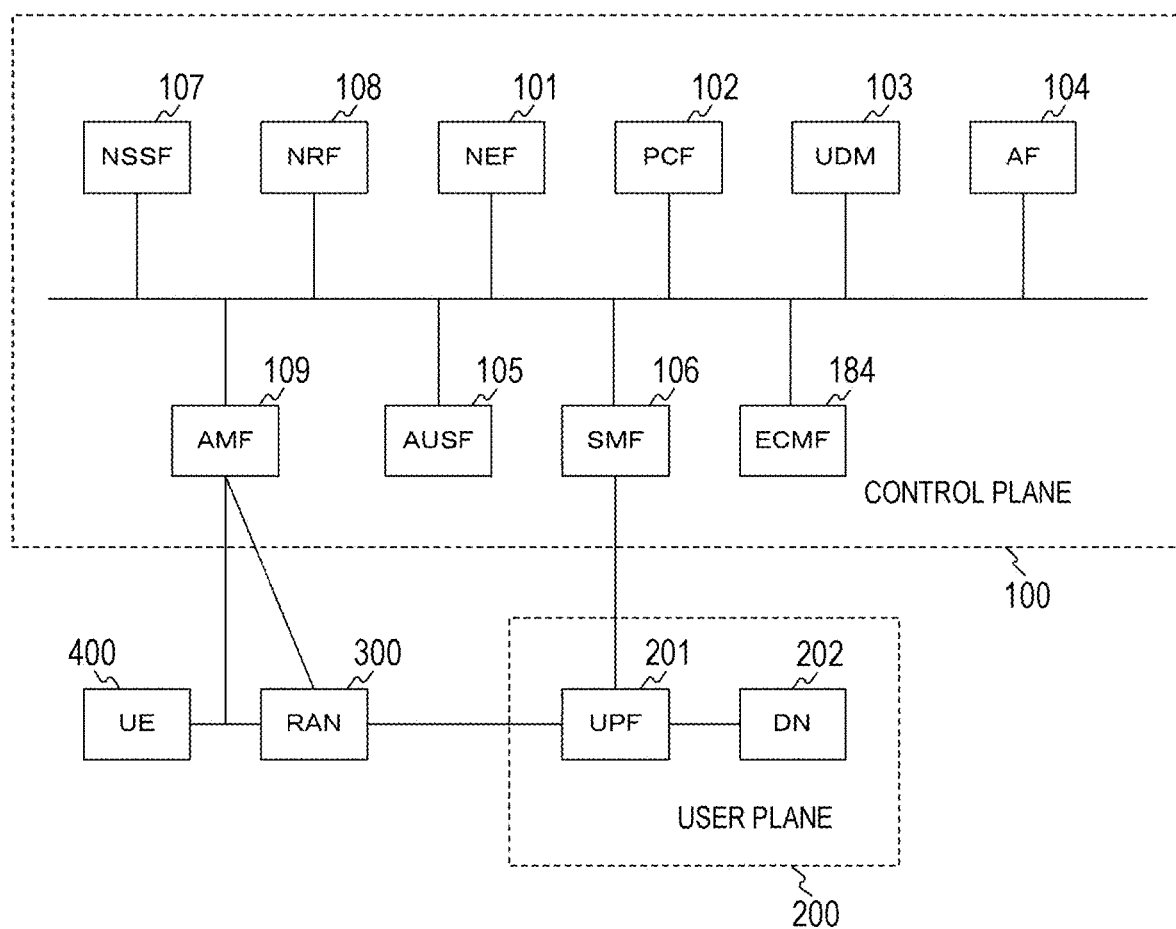
FIG. 2 is a diagram that illustrates a functional configuration example of the communication system according to the embodiment of the present technology.

FIG. 2 is a diagram that illustrates a functional configuration example of the communication system according to the embodiment of the present technology. UE 400 corresponds to the equipment 40 described above. An RAN 300 corresponds to the base station apparatus 30 described above.

As described above, the core network 10 is dividable into the control plane 100 and the user plane 200. In this example, the control plane 100 includes an NEF 101, a PCF 102, a UDM 103, an AF 104, an AUSF 105, an SMF 106, an NSSF 107, an NRF 108, an AMF 109, and an ECMF 184. Here, the ECMF 184 is a new function in this embodiment, and the remaining functions are existing network functions of the 3GPP.

These network functions are connected to a bus. These network functions receive a response to a request, thereby receiving a predetermined service (SBA: Service Based Architecture). A protocol in this SBA is based on HTTP/2, and information is exchangeable using a file format of a JavaScript object notation (JSON) format (JavaScript is registered trademark).

The application function (AF) 104 exchanges information with the core network 10 in order to supply a service. The AF 104 is capable of transmitting a service request and receiving a response from each network function via the NEF 101. Basically, it is used in order that the AF 104 acquires the information of each network function. The AF 104 is capable of acquiring from the core network 10 information, such as a position, a time zone, and a connection state (an idling state/an RRC connection state), concerning the UE 400. Note that this AF 104 can be deployed inside or outside the core network 10.

The network exposure function (NEF) 101 is an interface that provides information of each function in the core network 10 to the AF 104 inside or outside the core network 10.

The policy control function (PCF) 102 provides a quality of service (QoS) policy.

The unified data management (UDM) 103 performs control for storing data in the core network 10.

The authentication server function (AUSF) 105 has a function of authenticating whether or not the UE 400 is reliable equipment in an attach request.

The session management function (SMF) 106 has a function of processing the attach request of the UE 400.

The network slice selection function (NSSF) 107 has a function of allocating a network slice to the UE 400.

The network repository function (NRF) 108 performs service discovery.

The access and mobility management function (AMF) 109 performs control on handover.

The edge computing management function (ECMF) 184 is a new function in this embodiment, and manages the deployment of the network function in the core network 10.

The user plane 200 includes a UPF 201 and a DN 202. The user plane function (UPF) 201 is a connection point with the data network (DN) 202. In edge computing, the UPF 201 is deployed nearer to the UE 400 as much as possible. That is, the deployment of the part including the UPF 201 and the DN 202 in the network near the UE 400 and the RAN 300 connected with the UE 400 in terms of distance enables reduction in transfer latency between the UE 400 and the DN 202.

Figure 3:
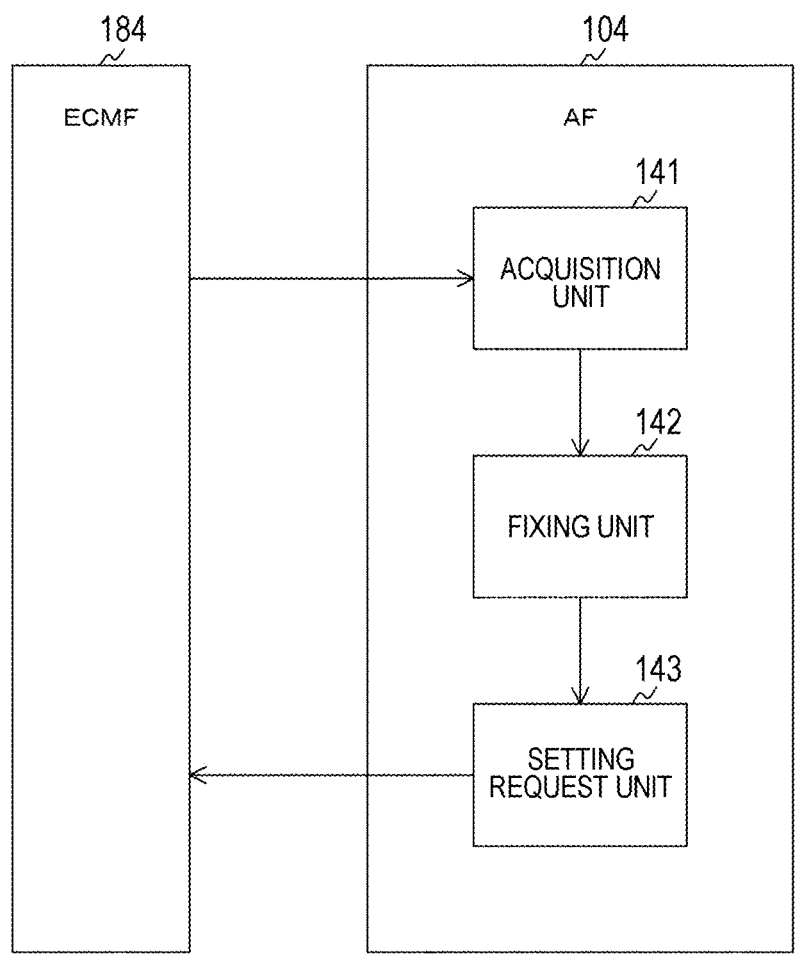
FIG. 3 is a diagram that illustrates a functional configuration example of an AF 104 according to the embodiment of the present technology.

FIG. 3 is a diagram that illustrates a functional configuration example of the AF 104 according to the embodiment of the present technology. This AF 104 includes an acquisition unit 141, a fixing unit 142, and a setting request unit 143.

The acquisition unit 141 acquires information regarding performance corresponding to a deployment position of a predetermined partial function of the core network 10. It is mainly assumed in this first embodiment that the acquisition unit 141 acquires information regarding performance corresponding to a deployment position of the UPF 201.

The fixing unit 142 fixes the deployment position of the partial function on the basis of the information regarding the performance and acquired by the acquisition unit 141. It is mainly assumed in this first embodiment that the fixing unit 142 fixes the deployment position of the UPF 201.

The setting request unit 143 issues a request of setting the partial function for the deployment position fixed by the fixing unit 142, to the ECMF 184 of the core network 10.

In general, it is often difficult for the AF 104 to designate the deployment position of the UPF 201. This is because even when the actual location of the network is designated with latitude and longitude, the perspective of the actual location may be meaningless depending on the topology of the network. It is therefore desirable that the core network 10 gives a plurality of configurations that enable deployment of the UPF 201, to the AF 104 in advance. For each configuration, a latency time between the base station apparatus 30 and the UPF 201 is disclosed as information.

Furthermore, in a case where it is desired to issue a request of deploying the UPF 201 in consideration of a latency between the AF 104 and the UPF 201, the AF 104 issues a request of measuring a latency between the AF 104 and a supposed location of the UPF 201. The fixing may of course be made in consideration of both the latency between the base station apparatus 30 and the UPF 201 and the latency between the UPF 201 and the AF 104.

[Operation]

Figure 4:
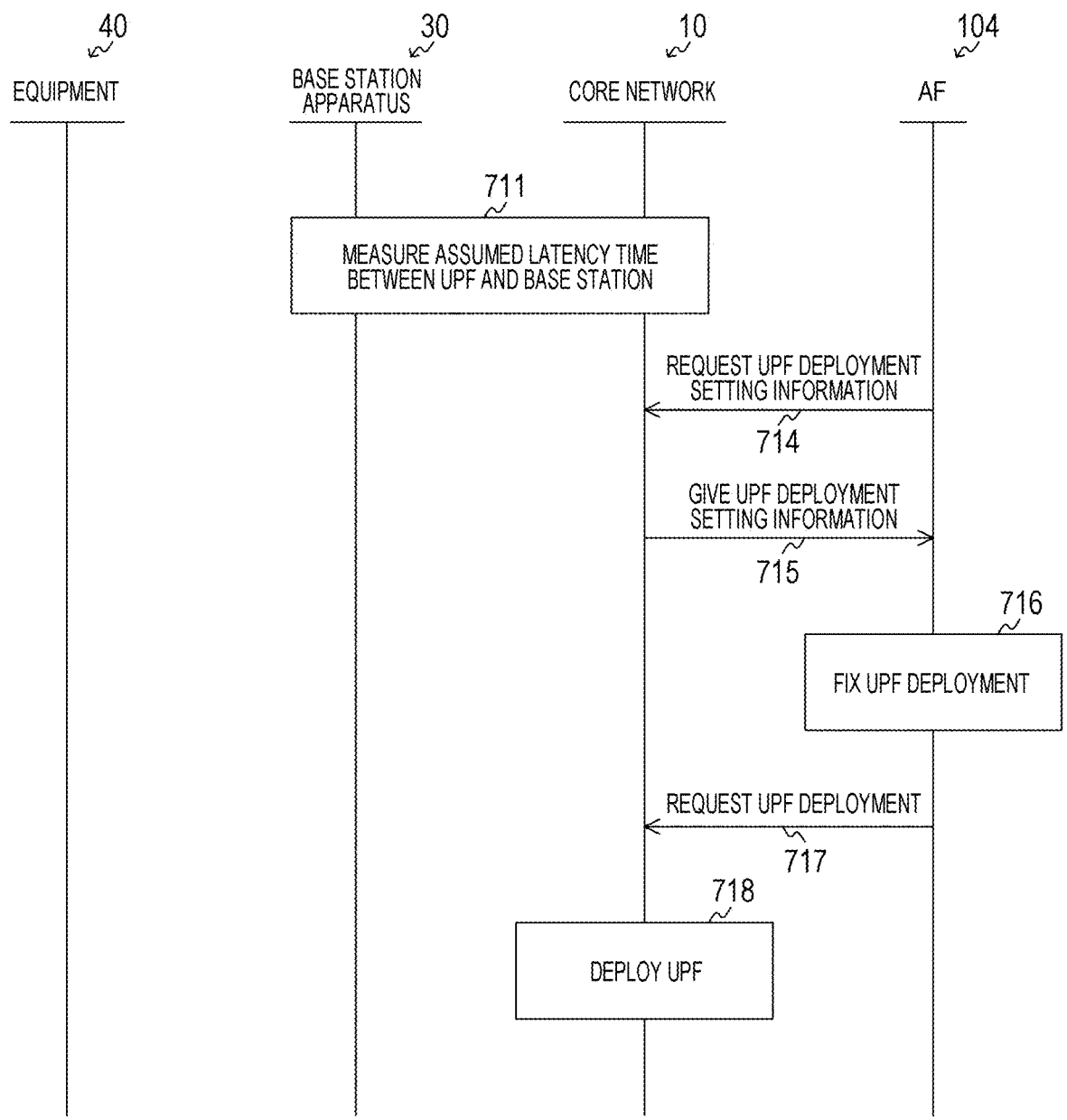
FIG. 4 is a sequence diagram that illustrates a first example of a processing procedure according to a first embodiment of the present technology.

FIG. 4 is a sequence diagram that illustrates a first example of a processing procedure according to the first embodiment of the present technology.

The core network 10 acquires information regarding a latency time from the base station apparatus 30 for each deployment position of the UPF 201 (711). That is, the core network 10 is capable of acquiring information regarding a latency time in advance.

The AF 104 issues a request of the information regarding the latency time to the core network 10 (e.g., UPF deployment setting information) (714). In response to this, the core network 10 gives the information regarding the latency time to the AF 104 (e.g., UPF deployment setting information) (715).

The AF 104 fixes the deployment position of the UPF 201 in consideration of the information regarding the latency time (716), and issues a request of setting the deployment position of the UPF 201 to the core network 10 (717).

The core network 10 deploys the UPF 201 in response to the request from the AF 104 (718).

FIG. 5 is a diagram that illustrates a first example of information given to the AF 104 according to the first embodiment of the present technology.

This first example concerns information regarding a latency time between the base station apparatus 30 and the UPF 201. That is, "1 ms", "5 ms", and "10 ms" are indicated for a setting number "1", a setting number "2", and a setting number "3", respectively. The AF 104 selects one from these alternatives, and issues a request of setting the deployment position of the UPF 201 to the core network 10, using the setting number.

Figure 6:
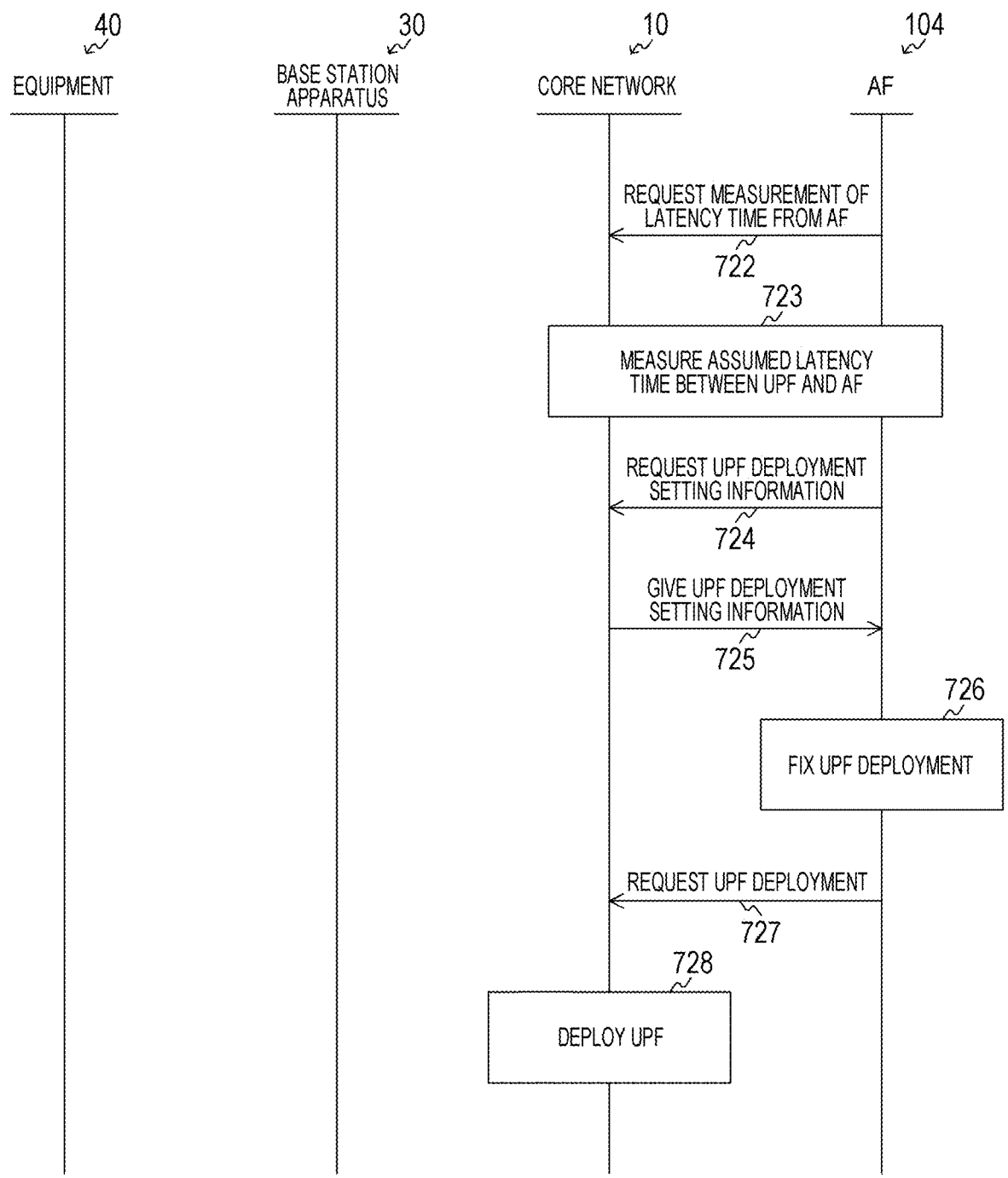
FIG. 6 is a sequence diagram that illustrates a second example of the processing procedure according to the first embodiment of the present technology.

FIG. 6 is a sequence diagram that illustrates a second example of the processing procedure according to the first embodiment of the present technology.

In this second example, in order to deploy the UPF 201 in consideration of a latency between the AF 104 and the UPF 201, the AF 104 issues a request of measuring a latency between the AF 104 and the supposed location of the UPF 201, to the core network 10 (722).

The core network 10 measures an assumed latency time between the UPF 201 and the AF 104 (723).

The AF 104 issues a request of the information regarding the latency time between the UPF 201 and the AF 104 to the core network 10 (e.g., UPF deployment setting information) (724). In response to this, the core network 10 gives the information regarding the latency time to the AF 104 (e.g., UPF deployment setting information) (725).

The AF 104 fixes the deployment position of the UPF 201 in consideration of the information regarding the latency time (726), and issues a request of setting the deployment position of the UPF 201 to the core network 10 (727).

The core network 10 deploys the UPF 201 in response to the request from the AF 104 (728).

FIG. 7 is a diagram that illustrates a second example of the information given to the AF 104 according to the first embodiment of the present technology.

This second example concerns information regarding a latency time between the AF 104 and the UPF 201. That is, "1 ms", "5 ms", and "10 ms" are indicated for a setting number "1", a setting number "2", and a setting number "3", respectively. The AF 104 selects one from these alternatives, and issues a request of setting the deployment position of the UPF 201 to the core network 10, using the setting number.

Figure 8:
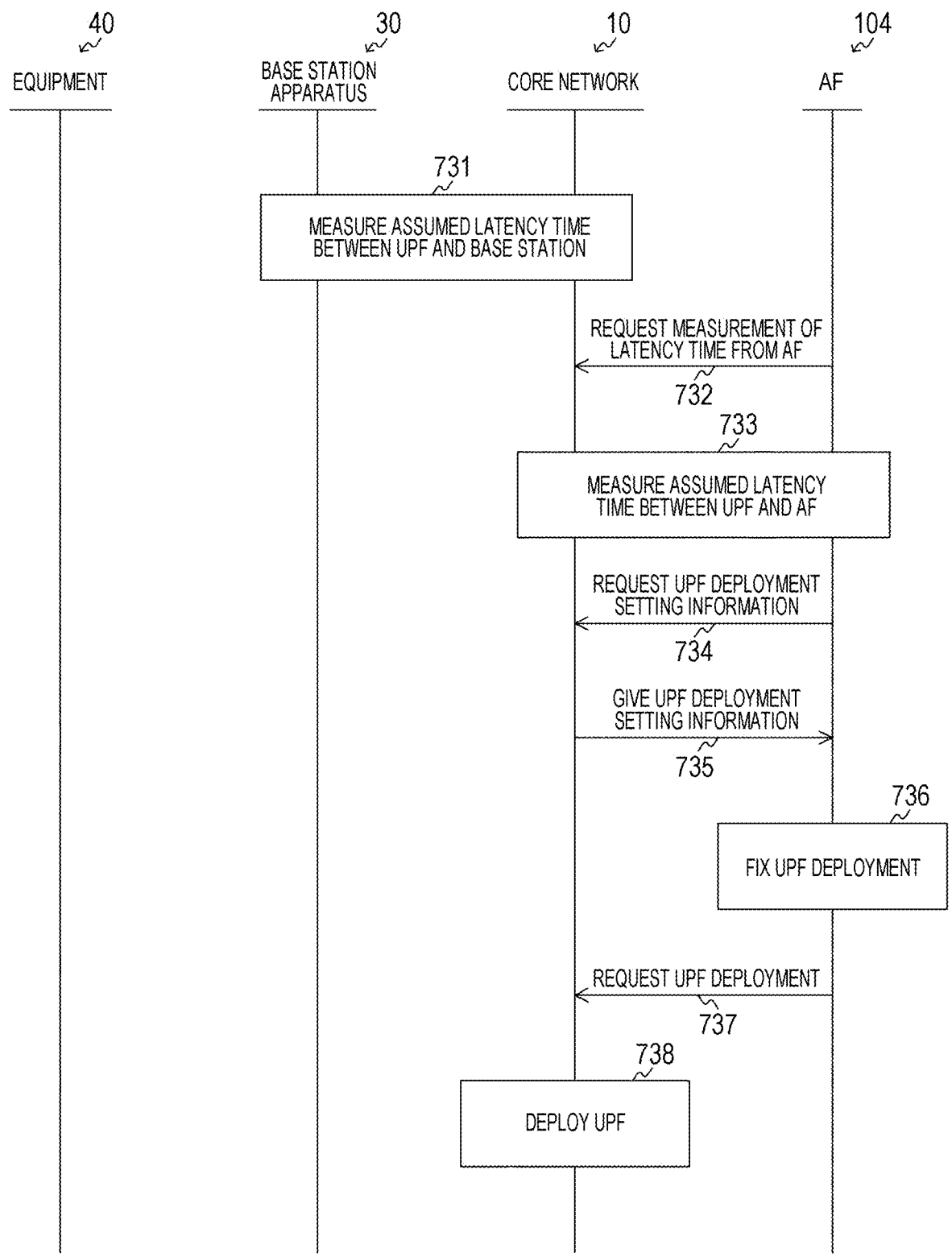
FIG. 8 is a sequence diagram that illustrates a third example of the processing procedure according to the first embodiment of the present technology.

FIG. 8 is a sequence diagram that illustrates a third example of the processing procedure according to the first embodiment of the present technology.

In this third example, the UPF 201 is deployed in consideration of both information regarding a latency time between the base station apparatus 30 and the UPF 201 and information regarding a latency time between the AF 104 and the UPF 201. Therefore, the core network 10 measures information regarding an assumed latency time between the UPF 201 and the base station apparatus 30 (731).

Furthermore, the AF 104 issues a request of measuring a latency between the AF 104 and a supposed location of the UPF 201, to the core network 10 (732).

The core network 10 measures an assumed latency time between the UPF 201 and the AF 104 (733).

The AF 104 issues a request of the information regarding the latency time between the UPF 201 and the AF 104 to the core network 10 (e.g., UPF deployment setting information) (734). In response to this, the core network 10 gives the information regarding the latency time to the AF 104 (e.g., UPF deployment setting information) (735).

The AF 104 fixes the deployment position of the UPF 201 in consideration of both the information regarding the latency time between the base station apparatus 30 and the UPF 201 and the information regarding the latency time between the AF 104 and the UPF 201 (736), and issues a request of setting the deployment position of the UPF 201 to the core network 10 (737).

The core network 10 deploys the UPF 201 in response to the request from the AF 104 (738).

[Information Regarding Performance]

The foregoing examples each exemplify information regarding a latency time, as the information regarding the performance of the deployment position of the UPF 201. In addition to the latency described above, a cost, a resistance to congestion, an assumed throughput, and the like are assumed as the information regarding the performance, and a combination including at least one of them may be made.

FIG. 9 is a diagram that illustrates a third example of the information given to the AF 104 according to the first embodiment of the present technology.

This third example concerns information regarding a resistance to congestion. That is, a "low" resistance, a "high" resistance, and a "middle" resistance are indicated for a setting number "1", a setting number "2", and a setting number "3", respectively. The AF 104 selects one from these alternatives, and issues a request of setting the deployment position of the UPF 201 to the core network 10, using the setting number.

Note that in a case where the UPF 201 is deployed near the base station apparatus 30 and the AF 104 is deployed near the UPF 201, an influence of congestion on the depth side of the core network 10 is less likely to be caused since the path is short.

FIG. 10 is a diagram that illustrates a fourth example of the information given to the AF 104 according to the first embodiment of the present technology.

This fourth example concerns information regarding a charging cost which a service provider pays. That is, a "low" cost, a "high" cost, and a "middle" cost are indicated for a setting number "1", a setting number "2", and a setting number "3", respectively. The AF 104 selects one from these alternatives, and issues a request of setting the deployment position of the UPF 201 to the core network 10, using the setting number.

FIG. 11 is a diagram that illustrates a fifth example of the information given to the AF 104 according to the first embodiment of the present technology.

This fifth example concerns information regarding a throughput. That is, a "low" throughput, a "high" throughput, and a "middle" throughput are indicated for a setting number "1", a setting number "2", and a setting number "3", respectively. The AF 104 selects one from these alternatives, and issues a request of setting the deployment position of the UPF 201 to the core network 10, using the setting number.

When the distance is short depending on the deployment position of the UPF 201, a retransmission time by ACK/NACK of a transmission control protocol (TCP) is reduced. The latency is therefore reduced, so that the throughput is improved. An application of fixing the deployment position of the UPF 201 in accordance with the information of the throughput is therefore assumed.

As described above, in the first embodiment of the present technology, the AF 104 fixes the deployment position of the UPF 201 on the basis of the information regarding the performance, and issues the request of the setting to the core network 10. With this configuration, the service provider is able to flexibly control the position of the UPF 201. Since the network configuration is settable as the service provider desires, the service for the user's request can be customized in detail. For example, an advantageous effect of readily securing the quality of a communication path to be provided to a user can be expected.

[Implementable Example (Cloud Game System)]

Next, a description will be given of an implementable example corresponding to the first embodiment. More specifically, a description will be given of a case where a service to be provided to the equipment 40 in the first embodiment is a cloud game using augmented reality (AR) or virtual reality (VR).

In 5G New Radio (NR), some services have been studied as use cases. Among them, AR/VR services have been expected as killer contents of the 5G NR. For a cloud game using AR/VR, requirements about rendering of a game image are specified in "3GPP TR 22.842 v17.1.0" and "TS 22.261 v17.0.1". More specifically, these technical report and technical specification specify a "motion-to-photon" latency and a "motion-to-sound" latency as an allowable latency at a level giving no sense of discomfort to an AR/VR user, in rendering of a game image.

The "motion-to-photon" latency is defined as a latency between a physical motion of a user's head and an updated image in an AR/VR headset (e.g., a head mount display (HMD)). The foregoing technical report specifies that the "motion-to-photon" latency falls within a range from 7 to 15 ms while maintaining a required data rate (1 Gbps). The "motion-to-sound" latency is defined as a latency between a physical motion of a user's head and an updated sound wave from a head mount speaker to user's ears. The foregoing technical report specifies that the "motion-to-sound" latency is less than 20 ms. Here, the AR/VR headset or the head mount speaker may be the equipment 40 according to the first embodiment.

In order to satisfy the conditions about these latencies, the foregoing technical report and technical specification specify that the following two requirements are satisfied for rendering, as a 5G system. First, it is specified as the first requirement that a "Max Allowed End-to-end latency" (maximum allowable latency) is 5 ms. This means that, for example, a total allowable latency at the uplink and downlink between equipment (e.g., the equipment 40) and an interface to a data network (e.g., the network where the AF

104 is deployed) is 5 ms. Furthermore, it is specified as the second requirement that a "Service bit rate: user-experienced data rate" is 0.1 Gbps (100 Mbps). This is a throughput capable of supporting an AR/VR content.

Note that the rendering in this implementable example includes cloud rendering, edge rendering, or split rendering. In the cloud rendering, AR/VR data is subjected to rendering on a cloud of a network. Here, the cloud refers to a network including a certain entity or a plurality of entities, based on a core network (including a UPF) deployment and a data network (including an application server and an AF) deployment in which a user's position is not taken into consideration. In the edge rendering, AR/VR data is subjected to rendering on an edge of a network. Here, the edge refers to a network including a certain entity or a plurality of entities, based on a core network (including a UPF) deployment and a data network (including an application server and an AF) deployment near a user's position. For example, an edge computing server that is an application server in a data network in a network deployment for edge computing corresponds to the edge. Furthermore, the split rendering means rendering a part of which is performed on a cloud, and the remaining part of which is performed on an edge.

Figure 12:
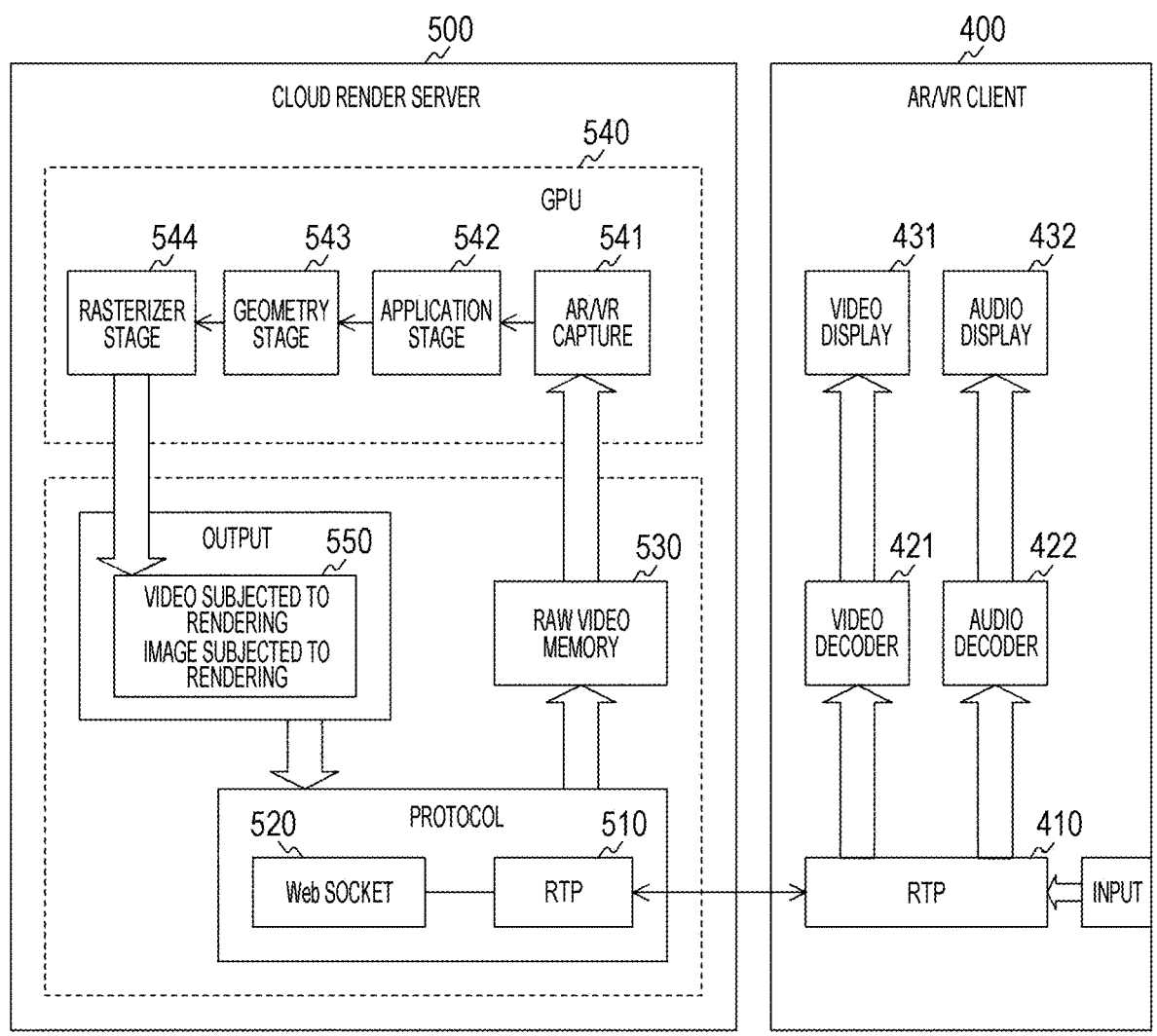
FIG. 12 is a diagram that illustrates a configuration example of a cloud rendering system as an implementable example according to the first embodiment of the present technology.

FIG. 12 is a diagram that illustrates a configuration example of a cloud rendering system as an implementable example according to the first embodiment of the present technology. Here, images of a cloud render server 500 and an AR/VR client 400 about rendering, which are described in the foregoing technical report, are assumed.

The cloud render server 500 subjects a RAW video to rendering in accordance with a request from the AR/VR client 400. This cloud render server 500 communicates with the AR/VR client 400 by a real-time transport protocol (RTP) 510 via a Web socket 520. The RAW video received from the AR/VR client 400 is once held in a RAW video memory 530, and is processed by a graphics processing unit (GPU) 540. The GPU 540 subjects the RAW video to rendering through respective procedures of an AR/VR capture 541, an application stage 542, a geometry stage 543, and a rasterizer stage 544. The video (or the image) 550 subjected to rendering by the GPU 540 is supplied to the AR/VR client 400 again by the RTP 510.

The AR/VR client 400 communicates with the cloud render server 500 by the RTP 410. The video supplied from the cloud render server 500 is decoded by a video decoder 421, and is displayed on a video display 431. Furthermore, audio is decoded by an audio decoder 422, and is output from an audio display 432.

Here, the AR/VR client 400 may correspond to the equipment 40 according to the foregoing first embodiment. Furthermore, the cloud render server 500 may be the AF 104 according to the foregoing first embodiment, or may be an application server for edge computing (e.g., an edge computing server) that operates in cooperation with the AF 104. Furthermore, the cloud render server 500 may be called an edge render server or a split render server.

In the foregoing first embodiment, a latency time between the UPF and another node (e.g., the AF 104) and a throughput are taken into consideration in fixing the UPF deployment. In this implementable example, a determination as to whether or not the foregoing two requirements "Max Allowed End-to-end latency" and "Service bit rate: user-experienced data rate" are satisfied is additionally used for fixing the UPF deployment as will be described below.

Figure 13:
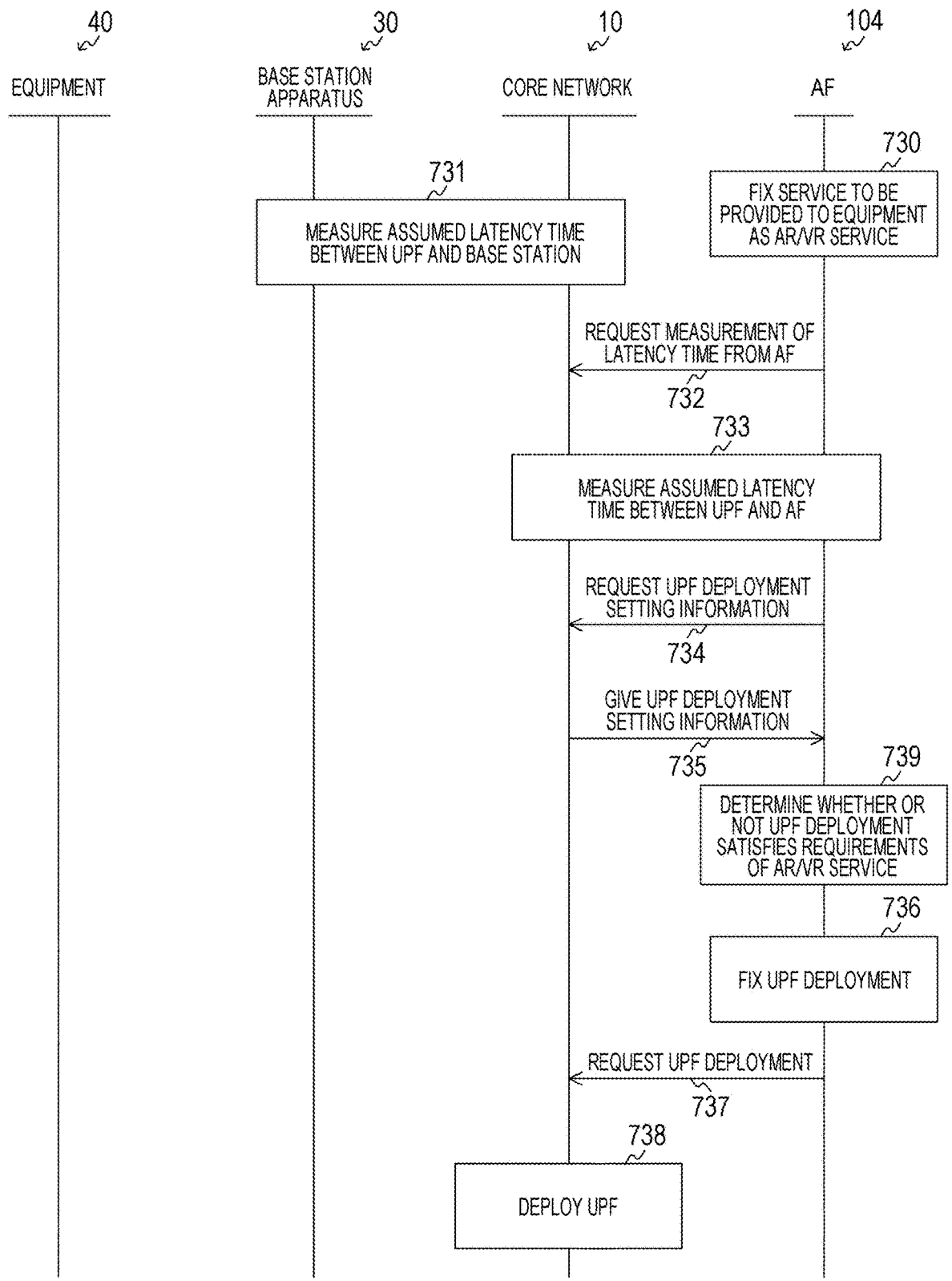
FIG. 13 is a sequence diagram that illustrates one example of a processing procedure as an implementable example according to the first embodiment of the present technology.

FIG. 13 is a sequence diagram that illustrates one example of a processing procedure as an implementable example according to the first embodiment of the present technology.

In this example, both the information regarding the latency time between the base station apparatus 30 and the UPF 201 and the information regarding the latency time between the AF 104 and the UPF 201 are compared with the foregoing "Max Allowed End-to-end latency" of 5 ms, and a UPF in which a latency between the UPF 201 and another node falls below the allowable latency is deployed as the UPF 201 for the equipment 40.

First, the AF 104 fixes a service to be supplied to the equipment 40 as an AR/VR service (730). Before and after that, the core network 10 measures information regarding an assumed latency time between the UPF 201 and the base station apparatus 30 (731).

Furthermore, the AF 104 issues a request of measuring a latency between the AF 104 and a supposed location of the UPF 201, to the core network 10 (732).

The core network 10 measures an assumed latency time between the UPF 201 and the AF 104 (733).

The AF 104 issues a request of the information regarding the latency time between the UPF 201 and the AF 104 to the core network 10 (734). In response to this, the core network 10 gives the information regarding the latency time to the AF 104 (735).

The AF 104 compares both the information regarding the latency time between the base station apparatus 30 and the UPF 201 and the information regarding the latency time between the AF 104 and the UPF 201 with the foregoing "Max Allowed End-to-end latency" of 5 ms (739). The AF 104 thus fixes the UPF in which the latency between the UPF 201 and the other node falls below the allowable latency as a deployment position of the UPF 201 for the equipment 40 (736), and issues a request of setting the deployment position of the UPF 201 to the core network 10 (737).

The core network 10 deploys the UPF 201 in response to the request from the AF 104 (738).

Note that in this example, the latency time between the UPF 201 and the other node is compared with "Max Allowed End-to-end latency"; however, the present technology is not limited thereto. An assumed throughput in the case of using the UPF 201 is compared with the foregoing "Service bit rate: user-experienced data rate", and the assumed throughput may fix the UPF that satisfies this as the deployment position of the UPF 201 for the equipment 40.

2. Second Embodiment

In the foregoing first embodiment, the deployment position of the UPF 201 in the core network 10 is controlled. In this second embodiment, on the other hand, a deployment position is controlled for each part of a network slice.

[Network Slice]

Figure 14:
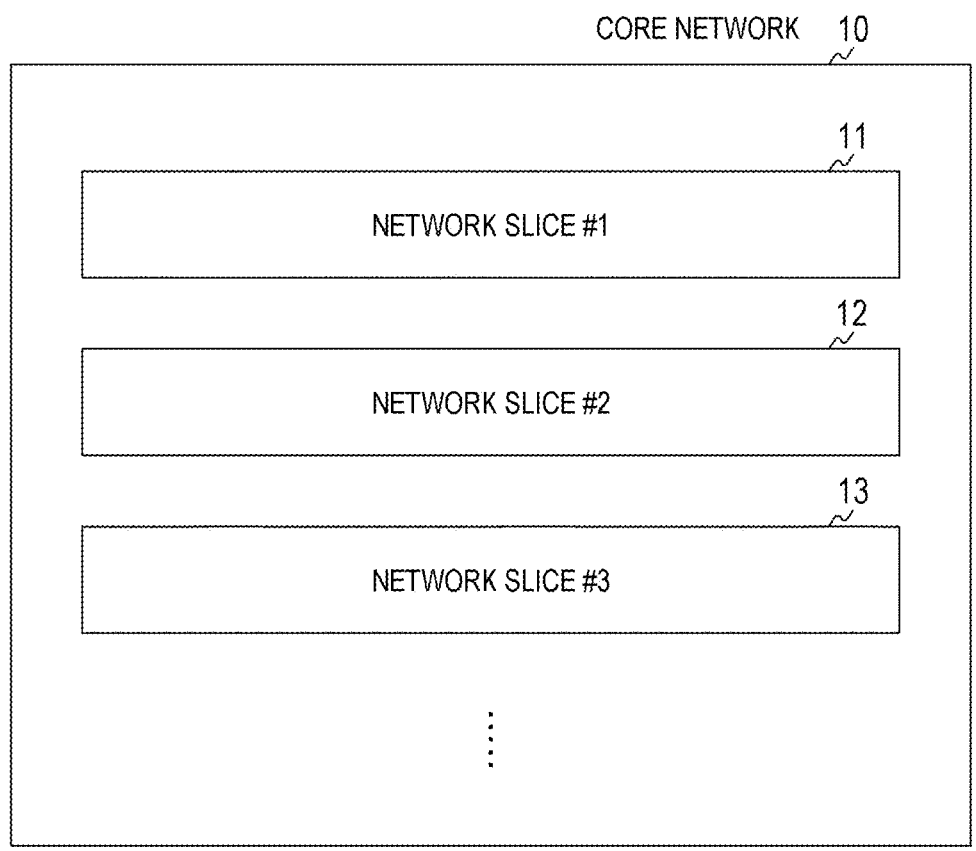
FIG. 14 is a diagram that illustrates an example of a network slice according to a second embodiment of the present technology.

FIG. 14 is a diagram that illustrates an example of a network slice according to a second embodiment of the present technology.

The core network 10 includes a plurality of network slices for efficiently accommodating communication forms of various use cases. For example, it can be assumed that the network slice #1 (11) is used for a low latency network, the network slice #2 (12) is used for MTC that facilitates communication with a network function, and the network slice #3 (13) is used for facilitation of device-to-device communication.

A multi-protocol label switch (MPLS) which has been used for achieving a virtual private network (VPN) is used with regard to the independence of each network slice of the core network 10. In a normal case, each switch performs routing while referring to an IP header of a destination. The MPLS applies a label, and an MPLS-compatible switch performs routing on the basis of the label. With this configuration, it is possible to explicitly designate a path passing a network for each VPN. Likewise, in achieving network slicing, it is possible to virtually deploy a plurality of networks by applying labels passing different paths for each network slice. Since networks that are not physically separated from each other are used, it is possible to isolate the network slices from each other by the control that ensures a bandwidth between VPNs for each network slice.

[Configuration of Communication System]

Figure 15:
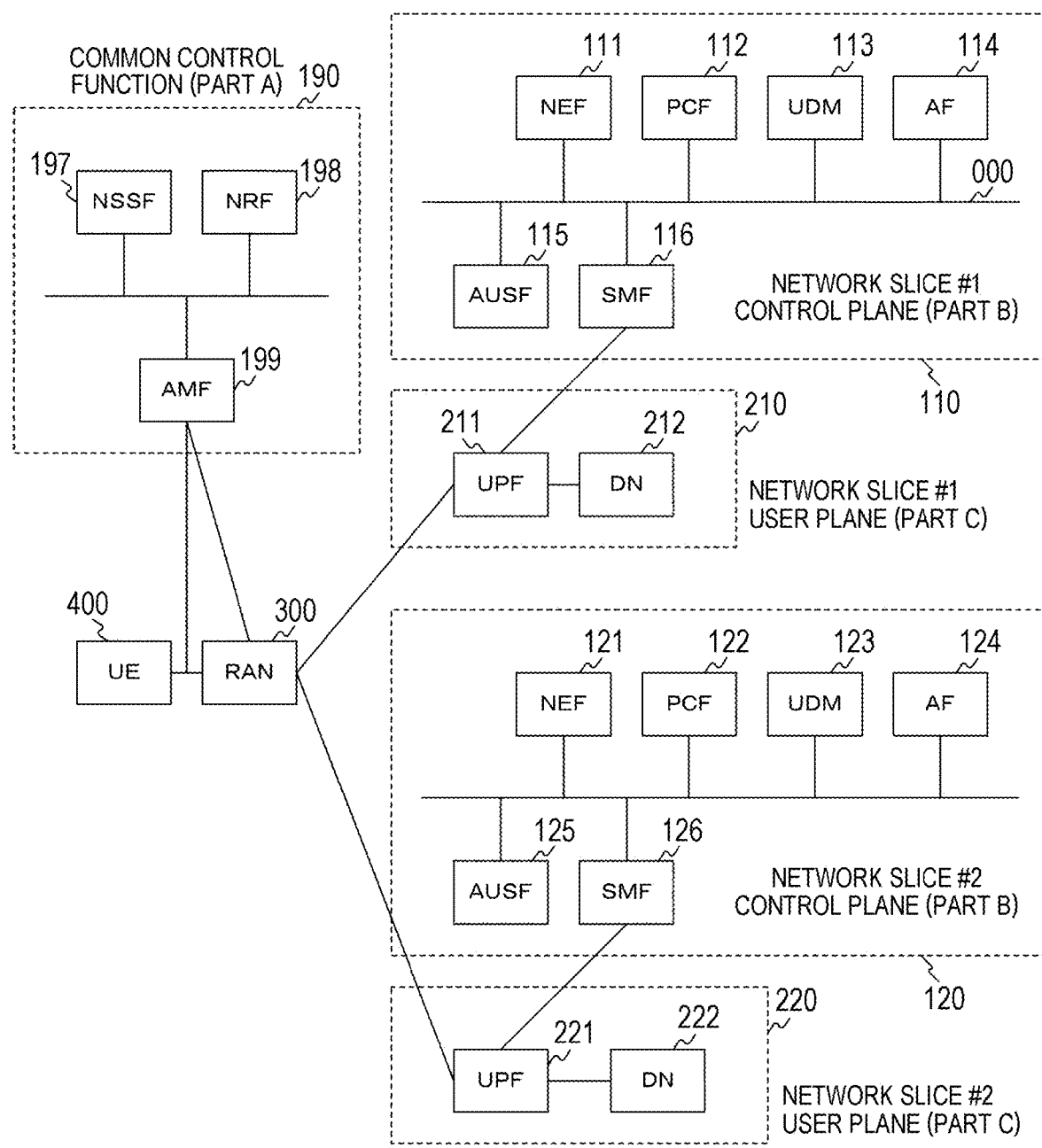
FIG. 15 is a diagram that illustrates a functional configuration example of a communication system according to the second embodiment of the present technology.

FIG. 15 is a diagram that illustrates a functional configuration example of a communication system according to the second embodiment of the present technology. In this second embodiment, two network slices are assumed, and a common control function 190 for both the network slices is also assumed.

The common control function 190 is a functional group common to two network slices (#1 and #2). An NSSF 197, an NRF 198, and an AMF 199 included in this common control function 190 are similar to those of the control plane 100 according to the foregoing first embodiment. Hereinafter, this common control function 190 is referred to as a "part A".

The network slice #1 is divided into a control plane 110 and a user plane 210. An NEF 111, a PCF 112, a UDM 113, an AF 114, an AUSF 115, and an SMF 116 included in the control plane 110 are similar to those of the control plane 100 according to the foregoing first embodiment. A UPF 211 and a DN 212 included in the user plane 210 are similar to those of the user plane 200 according to the foregoing first embodiment.

The network slice #2 is divided into a control plane 120 and a user plane 220. An NEF 121, a PCF 122, a UDM 123, an AF 124, an AUSF 125, and an SMF 126 included in the control plane 120 are similar to those of the control plane 100 according to the foregoing first embodiment. A UPF 221 and a DN 222 included in the user plane 220 are similar to those of the user plane 200 according to the foregoing first embodiment.

Hereinafter, the control plane 110 or 120 is referred to as a part B". Furthermore, the user plane 210 or 220 is referred to as a part C".

Since one service provider has a plurality of network slices exclusively for its service, the core network 10 is requested as to which one of the parts A, B, and C of each network slice is deployed nearby. Network slices that are different in nature from one another can be achieved depending on which one of the parts of each network slice is deployed nearby. Furthermore, since this designation designates a network slice identifier as will be described later, edge computing having a different characteristic can be achieved for each network slice.

[Deployment Request]

FIG. 16 is a diagram that illustrates a first example of a deployment request from an AF 104 according to the second embodiment of the present technology.

In this first example, a designation is made as to whether or not each of the parts A, B, and C is deployed. Furthermore, with regard to the parts B and C, a designation with a network slice identifier is made as to which network slice relates to the designation.

In response to a deployment request from the AF 104, the ECMF 184 in the core network 10 mainly deploys the respective parts of each network slice in a manner similar to that described in the foregoing first embodiment. Before the AF 104 sends the deployment request to the ECMF 184 of the core network 10, the AF 104 needs to know each of how many network slices is possibly created and an identifier of each network slice.

FIG. 17 is a diagram that illustrates a second example of the deployment request from the AF 104 according to the second embodiment of the present technology.

In this second example, with regard to a plurality of network slices, a designation is made as to whether or not the respective parts are deployed while the respective network slice identifiers are designated. That is, a deployment request is issued in a state in which the number of network slices which the AF 104 needs is set at "2", and identifiers "#1", "#2", . . . are allocated to the respective network slices.

FIG. 18 is a diagram that illustrates a third example of the deployment request from the AF 104 according to the second embodiment of the present technology.

In this third example, a designation of a resistance to congestion is made as to each of the parts A, B, and C. Furthermore, with regard to the parts B and C, a designation with a network slice identifier is made as to which network slice relates to the designation.

A resistance to congestion is particularly problematic for the network slices. The independence of each network slice depends on how to achieve the network slices. The level differs depending on whether the network slices are separated by another server or separated by a virtual machine in one server. That is, congestion is less likely to occur when a server itself is disposed separately from a server at which another congestion occurs, so as not to be affected by the other congestion. The AF 104 intends to control the degree of a resistance to congestion as to the core network 10. It is therefore important to notify and request, from the AF 104, the core network 10 of the resistance level to congestion for each network slice and for each part of the network slice.

[Operation]

Figure 19:
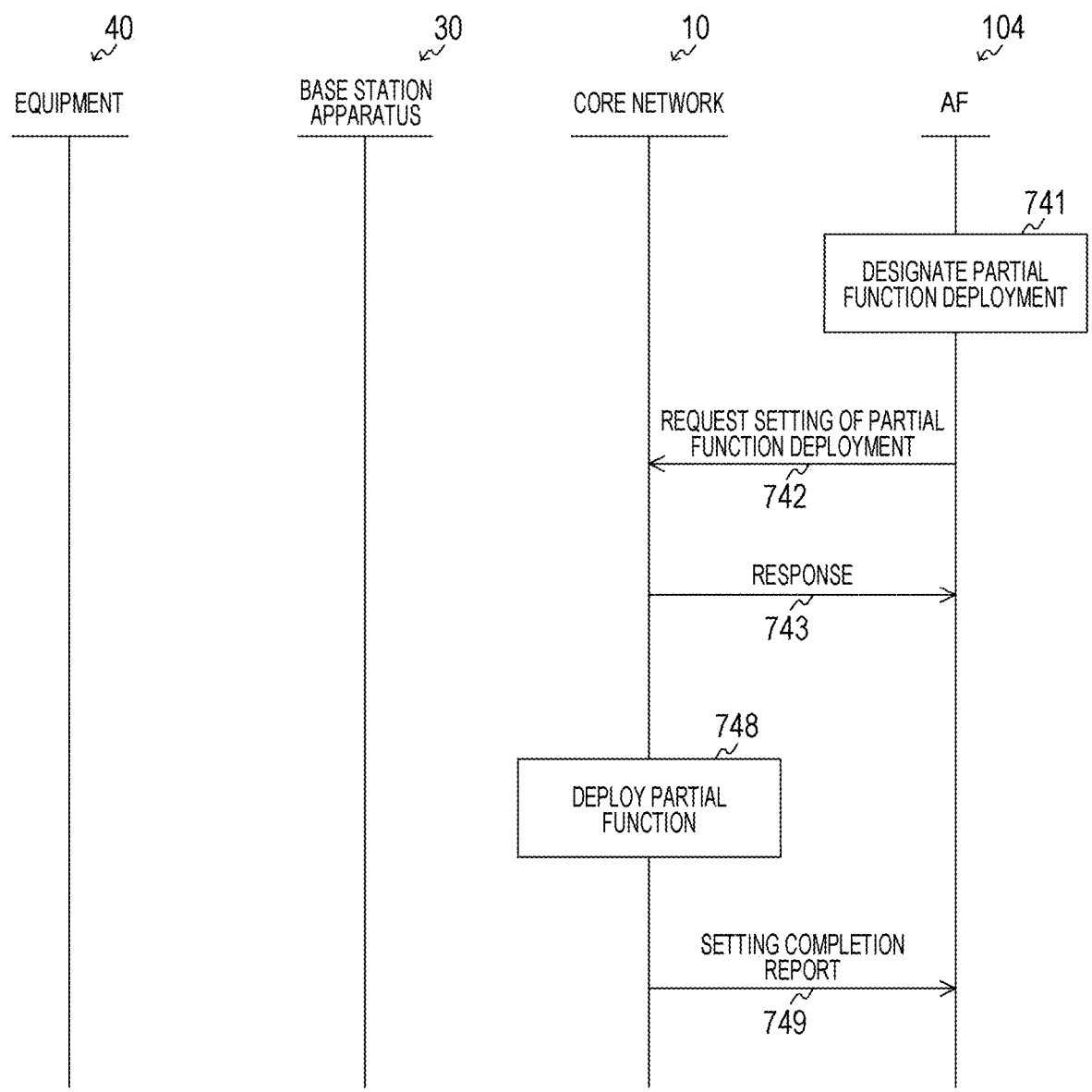
FIG. 19 is a sequence diagram that illustrates an example of a processing procedure according to the second embodiment of the present technology.

FIG. 19 is a sequence diagram that illustrates an example of a processing procedure according to the second embodiment of the present technology.

The AF 104 designates the deployment of a function of each of the parts A, B, and C in accordance with the example of the foregoing deployment request (741), and issues a request to the core network 10 (742).

The core network 10 gives a response to the deployment request from the AF 104 as to whether or not the deployment is possible (743). Then, if possible, the core network 10 performs the function deployment at the designated part (748), and notifies the AF 104 of the completion of the deployment, after the completion of the deployment (749).

Note that the deployment position may be fixed on the basis of the information regarding the performance for each part of the network slice in a manner similar to that described in the foregoing first embodiment.

As described above, according to the second embodiment of the present technology, it is possible to control the characteristics of the partial function in the network slice in detail by a combination of the network slice with the edge computing.

Note that the foregoing embodiments exemplify one example for embodying the present technology, and the matters in the embodiment and the matters specifying the invention in the claims have a correspondence relationship. Likewise, the matters specifying the invention in the claims and the matters in the embodiments of the present technology, the matters having the identical names to those of the matters specifying the invention, have a correspondence relationship. However, the present technology is not limited to the embodiment, and can be embodied in such a manner that various modifications are made to the embodiments within a range not departing from the scope of the present technology.

Furthermore, the processing procedures described in the foregoing embodiments may be regarded as a method having the series of the procedures, or may be regarded as a program for causing a computer to execute the series of procedures or a recording medium storing the program. As this recording medium, for example, a compact disc (CD), a mini disc (MD), a digital versatile disc (DVD), a memory card, a Blu-ray (registered trademark) disc, and the like are usable.

Note that the advantageous effects described in the present specification are merely exemplary and not limitative, and there may be achieved other advantageous effects.

Note that the present technology can also adopt the following configurations.

(1) A network deployment control apparatus including:
an acquisition unit configured to acquire information regarding performance corresponding to a deployment position of a predetermined partial function of a network;
a fixing unit configured to fix the deployment position of the partial function on the basis of the information regarding the performance; and
a setting request unit configured to issue a request of setting the partial function for the fixed deployment position, to the network.

(2) The network deployment control apparatus as recited in (1), in which
the information regarding the performance contains at least one of a latency, a cost, a resistance to congestion, or an assumed throughput.

(3) The network deployment control apparatus as recited in (1) or (2), in which
the acquisition unit acquires the information regarding the performance by issuing a request of measuring the performance and issuing a request of giving the measured performance.

(4) The network deployment control apparatus as recited in any of (1) to (3), in which
the fixing unit fixes the deployment position of the partial function from among a plurality of alternatives given in advance.

(5) The network deployment control apparatus as recited in any of (1) to (4), in which
the partial function includes a user plane function of performing user data exchange processing.

(6) The network deployment control apparatus as recited in (5), in which
the information regarding the performance includes a latency time from the user plane function.

(7) The network deployment control apparatus as recited in (5), in which
the information regarding the performance includes a latency time between the user plane function and a base station.

(8) The network deployment control apparatus as recited in (5), in which
the information regarding the performance includes a latency time between the user plane function and equipment.

(9) The network deployment control apparatus as recited in (8), in which
the latency time between the user plane function and the equipment includes a predetermined maximum allowable latency time.

(10) The network deployment control apparatus as recited in (5), (8), or (9), in which
the user data exchange processing includes AR or VR content data exchange processing.

(11) The network deployment control apparatus as recited in (2), in which
the assumed throughput includes a throughput required for an AR or VR content.

(12) The network deployment control apparatus as recited in any of (1) to (4), in which
the partial function includes a predetermined plane in a predetermined network slice.

(13) The network deployment control apparatus as recited in (12), in which
the predetermined plane includes a control plane for control processing.

(14) The network deployment control apparatus as recited in (12), in which
the predetermined plane includes a user plane for user data exchange processing.

(15) The network deployment control apparatus as recited in any of (1) to (14), in which
the network includes a core network in a 3GPP standard.

(16) A communication system including:
a network;
an acquisition unit configured to acquire information regarding performance corresponding to a deployment position of a predetermined partial function of the network;
a fixing unit configured to fix the deployment position of the partial function on the basis of the information regarding the performance; and
a setting request unit configured to issue a request of setting the partial function for the fixed deployment position, to the network.

(17) A network deployment control method including:
causing an acquisition unit to perform an acquisition procedure of acquiring information regarding performance corresponding to a deployment position of a predetermined partial function of a network;
causing a fixing unit to perform a fixing procedure of fixing the deployment position of the partial function on the basis of the information regarding the performance; and
causing a setting request unit to perform a setting request procedure of issuing a request of setting the partial function for the fixed deployment position, to the network.

REFERENCE SIGNS LIST

10 Core network
20 Backhaul line
30 Base station apparatus
40 Equipment
100, 110, 120 Control plane
104 Application function (AF)
184 Edge computing management function (ECMF)
141 Acquisition unit
142 Fixing unit
143 Setting request unit
190 Common control function
200, 210, 220 User plane

The invention claimed is:
1. A network deployment control apparatus comprising:
application function (AF) circuitry configured to:
fix a service to be provided to an equipment configured to perform a function that is dependent on a service provided by a network, wherein the function comprises a maximum allowed end-to-end latency, and wherein the network measures a first latency between a plurality of candidate user plane functions (UPFs) of the network and a base station in communication with the equipment, each of the plurality of candidate UPFs located at a different latitude and longitude;

issue a request to the network to measure a second latency between the AF circuitry and locations of the plurality of candidate UPFs;

in response to the request, receive from the network information about the first latency and the second latency:

compare a total of the first latency and the second latency to the maximum allowed end-to-end latency:

identify one UPF of the plurality of UPFs corresponding to a total of the first latency and second latency associated with the one UPF being below the maximum allowed end-to-end latency; and request the network to set the one UPF to provide the service to the equipment.

2. The network deployment control apparatus according to claim 1, wherein the service comprises augmented reality (AR) or virtual reality (VR) content data exchange processing.

3. The network deployment control apparatus according to claim 1, wherein the AF circuitry requests the network to set the one UPF in accordance with individual slices of the one UPF to include a control function common to two network slices, each of the two network slices divided into respective control and user planes.

4. The network deployment control apparatus according to claim 1, wherein
the network comprises a 3GPP core network.

5. A non-transitory computer product containing instructions for a method for network deployment control that is performed by a device, the method comprising:

fixing a service to be provided to an equipment configured to perform a function that is dependent on a service provided by a network, wherein the function comprises a maximum allowed end-to-end latency, and wherein the network measures a first latency between a plurality of candidate user plane functions (UPFs) of the network and a base station in communication with the equipment, each of the plurality of candidate UPFs located at a different latitude and longitude:

issuing a request to the network to measure a second latency between the AF circuitry and locations of the plurality of candidate UPFs;

in response to the request, receive from the network information about the first latency and the second latency:

comparing a total of the first latency and the second latency to the maximum allowed end-to-end latency;

identifying one UPF of the plurality of UPFs corresponding to a total of the first latency and second latency associated with the one UPF being below the maximum allowed end-to-end latency; and requesting the network to set the one UPF to provide the service to the equipment.

6. A method for network deployment control performed by a device, the method comprising:

fixing a service to be provided to an equipment configured to perform a function that is dependent on a service provided by a network, wherein the function comprises a maximum allowed end-to-end latency, and wherein the network measures a first latency between a plurality of candidate user plane functions (UPFs) of the network and a base station in communication with the equipment, each of the plurality of candidate UPFs located at a different latitude and longitude;

issuing a request to the network to measure a second latency between the AF circuitry and locations of the plurality of candidate UPFs;

in response to the request, receive from the network information about the first latency and the second latency:

comparing a total of the first latency and the second latency to the maximum allowed end-to-end latency;

identifying one UPF of the plurality of UPFs corresponding to a total of the first latency and second latency associated with the one UPF being below the maximum allowed end-to-end latency; and requesting the network to set the one UPF to provide the service to the equipment.

\* \* \* \* \*